W. E. BRITTON.
PROTECTIVE APPARATUS FOR ELECTRIC CIRCUITS.
APPLICATION FILED MAR. 12, 1915.
1,150,926.
Patented Aug. 24, 1915.
2 SHEETS—SHEET 1.
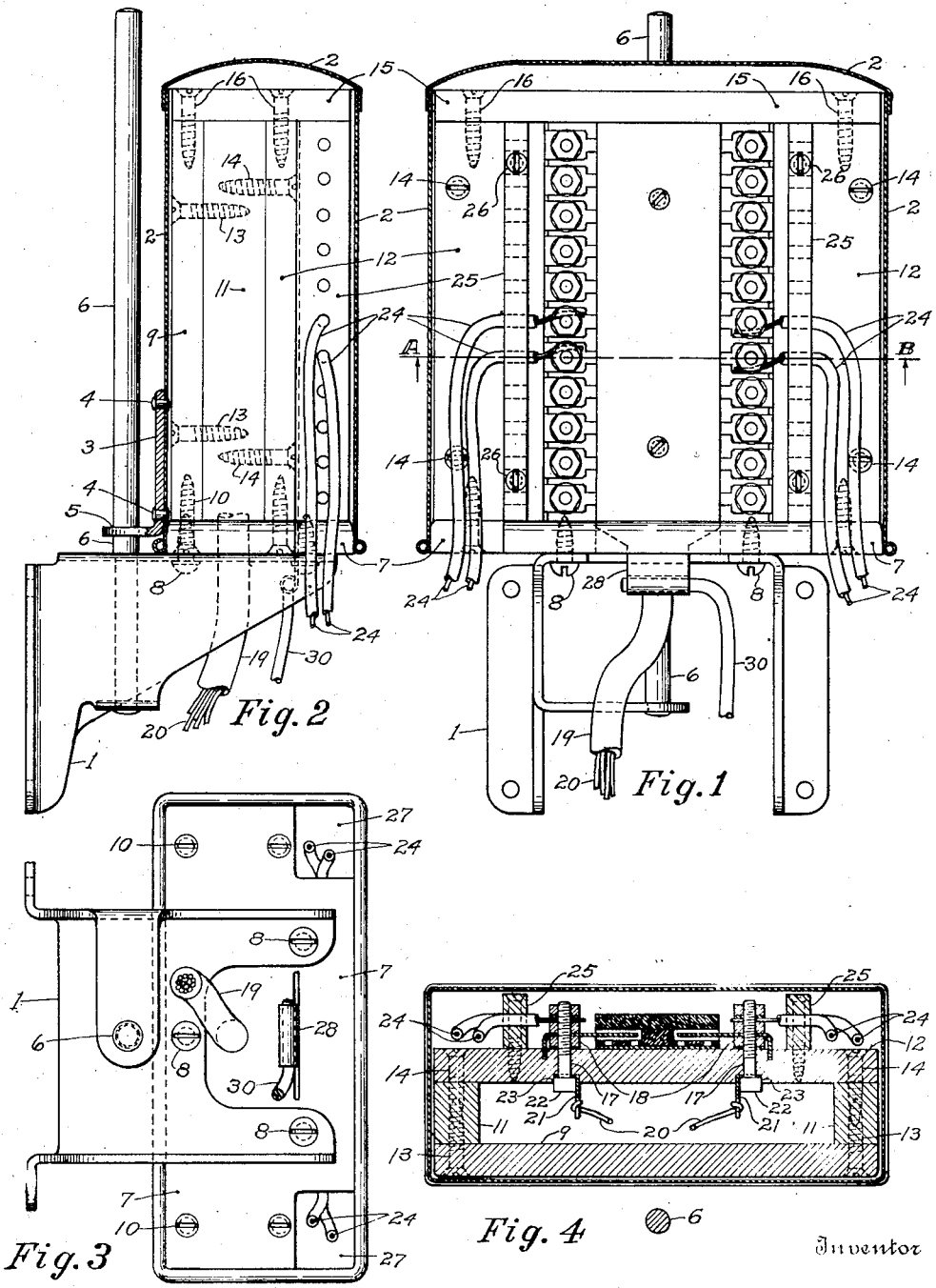
Witnesses
Claude J. Fry
J. D. Carpenter
Inventor
William E. Britton
By Dwight S. Cole
Attorney

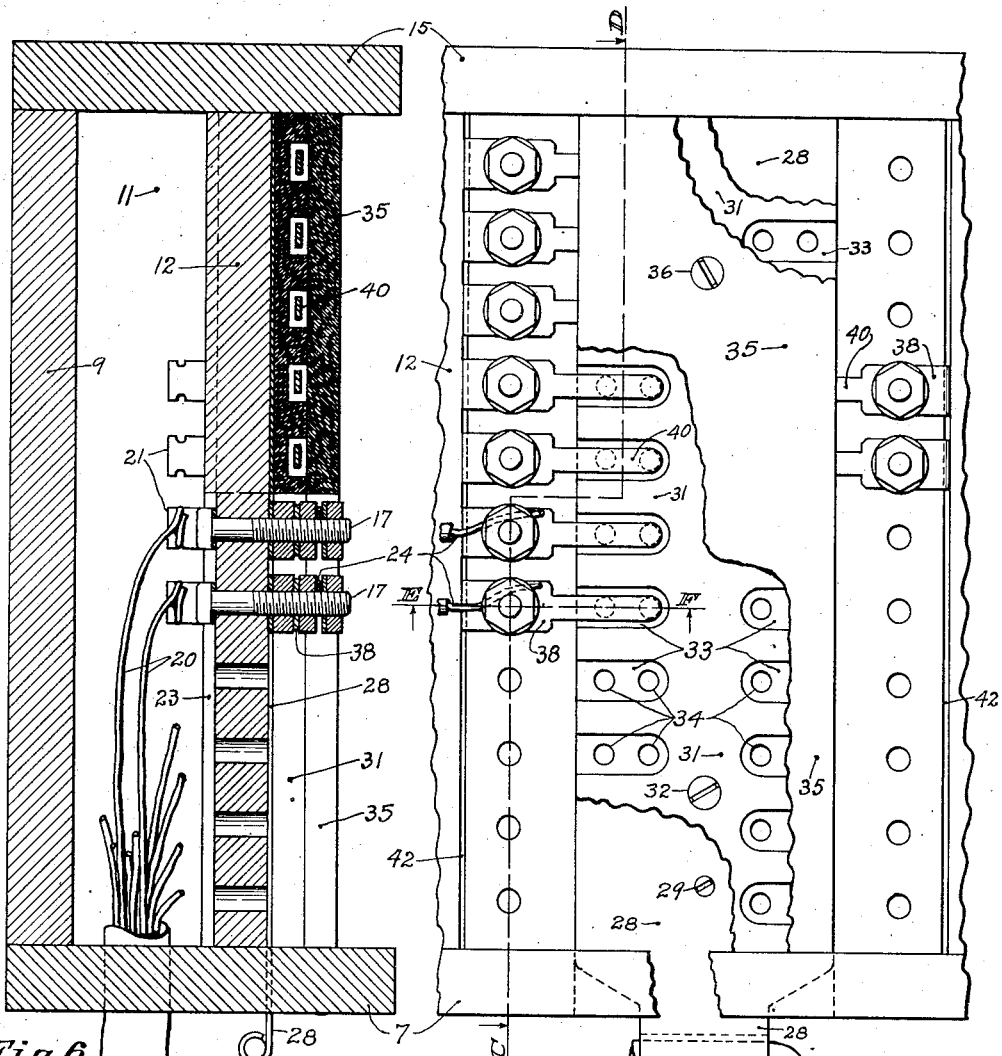
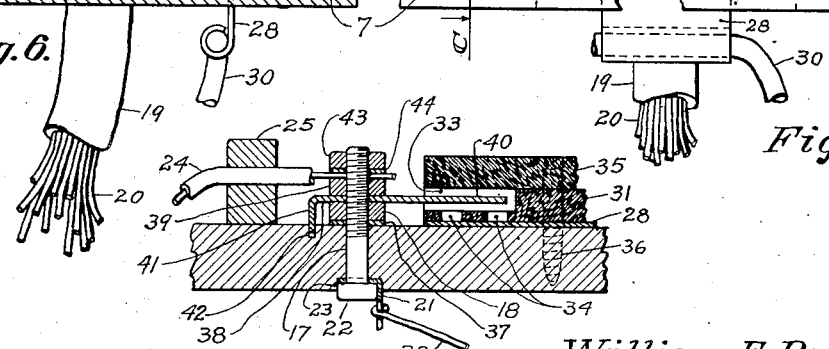
Fig. 6. Fig. 5. Fig. 7.
Inventor
William E. Britton
By Dwight S. Cole
Attorney

UNITED STATES PATENT OFFICE.

WILLIAM E. BRITTON, OF MUSKEGON, MICHIGAN.

PROTECTIVE APPARATUS FOR ELECTRIC CIRCUITS.

1,150,926.  Specification of Letters Patent.  Patented Aug. 24, 1915.

Application filed March 12, 1915. Serial No. 13,958.

*To all whom it may concern:*

Be it known that I, WILLIAM E. BRITTON, a citizen of the United States of America, residing at Muskegon, in the county of Muskegon and State of Michigan, have invented a new and useful Improvement in Protective Apparatus for Electric Circuits, of which the following is a specification.

My invention relates to protective apparatus for electric circuits, commonly called lightning arresters, by which all harmfully heavy currents, which may accidentally be discharged upon the protected circuit, are discharged to the ground and prevented from doing injury to the circuit or anything connected therewith.

The objects of my invention are to provide a device for the purpose which is simple, cheap and easy to construct, efficient and durable in operation, and not liable to be put out of order by repeated discharges of heavy current therethrough.

My invention consists essentially of the various novel features of construction, combination and arrangement of parts hereinafter more fully described, and particularly pointed out in the appended claims; reference being had to the accompanying drawings forming a part hereof and illustrating my improved device and the best method which I have devised for applying my invention in practice.

A protective apparatus constructed in accordance with my invention comprises in combination an electro-conductive line wire as part of an electric circuit; an electro-conductive member connected with the ground; a second electro-conductive member contacting with the said ground-connected member, said second member having a recess therein; a finger formed of or connected to said line wire and extending into said recess, said finger lying adjacent the walls of said recess but separated therefrom on all sides by an air space.

My invention is designed particularly for application to the electro-conductive wire portion of telephone, telegraph and like circuits, and the largest field of its employment contemplated by me is in connection with that portion of ordinary telephone circuits. In that service protective devices are commonly installed at the field terminus of a multi-conductor cable where the conductors of the cable are connected to the wires leading to the telephones in the near vicinity of the cable terminal; such wires being commonly known as "subscribers' wires." The connections of cable conductors or wires to subscribers' wires are usually made at what is commonly known as a cable box, usually located on a pole in the near vicinity of a group of telephones, and I have chosen such a cable box to illustrate an application of my invention in practice.

The purpose and general arrangement of cable boxes, used in telephone, telegraph and like services, is well known in the art and it will suffice that I explain the construction of the cable box shown by the accompanying drawings and point out the application of my invention thereto.

Referring now to the drawings: Figure 1 is a front view of a cable box embodying my invention—the protecting cover being cut away on a central plane parallel to the front; Fig. 2 a side view of the box, with cover cut away on a central plane parallel to the sides; Fig. 3 a bottom view of Figs. 1 and 2; Fig. 4 a horizontal section of the cable box taken on line A—B of Fig. 1, looking upward; Fig. 5 an enlarged view of the central portion of the front shown in Fig. 1, with the supporting bracket and cover removed and sides and portions of parts cut away; Fig. 6 a sectional view of Fig. 5 on line C—D, looking to the right; and, Fig. 7 a partial sectional view of Fig. 5 on line E—F, looking upward.

Like numbers refer to like parts in all of the figures.

Of the parts shown in the figures, 1 is the bracket upon which the cable box is mounted; 2 is the cover provided to protect the other members of the box from the elements; 3 is a bracket secured to cover 2 by rivets 4; 5 is a hole through bracket 3; 6 is a rod secured in bracket 1 and passing through hole 5; 7 is the bottom member of the box proper; 8 are the screws securing bottom member 7 to bracket 1; 9 is the rear or back member of the box; 10 are the screws securing bottom member 7 to back member 9; 11 are the side members of the box; 12 is the front member of the box or "backing" to which the parts constituting my invention are secured; 13 are screws securing members 9 and 11 together; 14 are screws securing members 11 and 12 together; 15 is the top member of the box;

16 are the screws securing member 15 in place; 17 are bolts or binding posts passing through member 12, and nuts 18 on the threaded ends of the posts 17 serve to clamp the posts securely in place; 19 is the multi-conductor cable; 20 are the conducting wires of the cable; 21 are the clips secured to posts 17 to which the cable conductors 20 are secured; 22 are the heads of posts 17 to which clips 21 are secured; 23 are grooves in back face of backing 12 to receive the heads 22 of posts 17 and secure the post from rotating; 24 are the subscribers' wires from cable box to telephones; 25 are guides for wires 24; 26 are screws securing guides 25 to backing 12; 27 are cut-out corners in base 7 to admit wires 24 to the box; 28 is the electro-conductive member or metallic plate secured to backing 12 by screws 29 and connected to ground by conducting wire 30 secured thereto; 31 is the electro-conductive member lying upon plate 28 and secured thereagainst by screws 32 passing through both members and into backing 12; 33 are the recesses in face of member 31; 34 are the holes from bottom of recesses 33 through member 31 to plate 28; 35 is the front member or bar of electro-conductive material lying against the front of member 31 and secured thereagainst by screws 36 passing therethrough and also through member 31 and plate 28 into backing 12, said bar 35 serving to form the fronts of the recess 33 in member 31; 37 are the washers interposed between backing 12 and nuts 18; 38 are the electro-conductive plates secured to posts 17 by being clamped between nuts 18 and 39; 40 are the finger ends of plates 38 which extend into recesses 33; 41 are the ends of the plates 38 opposite to finger ends 40 and bent to engage in groove 42 in backing 12 and thus secure plates 38 against rotary misplacement; 43 are nuts on posts 17 which serve to secure the ends of wires 24 to posts 17 by clamping them between the interposed washers 44 and nuts 39 on the posts.

Cable boxes embodying my invention may vary widely as to materials used, size and form of parts, methods of connecting parts together, etc., and the essential features of my protective device may vary similarly without departing from the essentials of the invention.

In the cable box shown by the accompanying drawings and described herein the materials employed and details of parts are such as to produce an effective device for the purpose, while the arrangement of binding posts and protective devices adapts the box to a ten-pair cable, with one pair of spare connections for emergency use.

As shown, the cable box is mounted on a bracket 1, preferably formed of sheet metal, having suitable members adapted to being secured against a pole or other mounting surface, as by screws passing through holes in the contacting wings thereof and thence into the pole.

The cable box is provided with a protecting cover or hood 2, preferably made of sheet metal, which is slidably removable upward so as to permit access to the box when required. Hood 2 is provided with an ear 3 having a hole 5 therethrough. A rod 6 secured in bracket 1 passes freely through hole 5 in ear 3 and extends upward higher than the top surface of the box, as shown. When it is desired to gain access to the box the hood is lifted upward until its bottom rim is slightly above the top surface of the box and then rotated somewhat about rod 6 as an axis, after which the hood is permitted to descend until part of its bottom edge rests upon the top of the box, which prevents it from descending farther, and when in that position the ear 3 engaging rod 6 holds the hood safely from toppling over and thus prevents it from falling.

The cable box shown is designed to be constructed of pieces of suitable wood carefully fitted and well secured together by screws. As shown by the drawings, members 7, 9, 11, 12 and 15 assemble so as to inclose a space into which the multi-conductor cable 19 leads through a hole in bottom member 7. In said space the conducting wires 20 of the cable are separately connected one each to each of the clips 21 on posts 17, as by being wound about and soldered thereto. After the cable conductors are secured to the clips, and members 7, 9, 11 and 12 are secured together, the space remaining within the box may be completely filled with a suitable insulating compound, as a protection to the cable connections, and then top member 15 may be applied and secured in place.

Binding posts 17 are of a well-known type, having square heads to which clips 21 are secured, as by being fitted thereon and soldered thereto. A groove 23 in rear face of backing 12 receives a portion of the square heads of posts 17 and attached clips 21, thereby securing the posts against rotary displacement when securing nuts 18 on the posts are properly adjusted.

Perforated bars 25, of suitable wood or other material, are provided as shown on front face of backing 12 and secured thereto by screws 26. The perforations through bars 25 are of such size as to permit of forcing the ends of the subscribers' wires 24 with the insulation thereon therethrough quite readily. Bars 25 serve to hold the naked ends of the several subscribers' wires apart and also assist in securing these wires to the box.

Subscribers' wires 24 enter the box through cut-out corners 27 in base 7 and pass thence upward and sidewise through the perforations in bars 25, where their bared ends are secured to posts 17 by being clamped between nuts 39 and 43 thereon. A washer 44 is interposed between nuts 39 and 43 to facilitate the clamping action on the wires 24.

Plates 38, of suitable electro-conductive metal, as German silver, are perforated to admit of passing the body portion of posts 17 therethrough. These plates are secured electro-conductively to posts 17 by being clamped rigidly between metal nuts 18 and 39 on the posts. The outer ends 41 of the plates 38 are bent toward the face of backing 12 and the tips of the bent portions fit snugly in grooves 42 in the face of backing 12, thereby securing the plates against rotary displacement about posts 17.

The parts co-acting with fingers 40, of plates 38, to form my improved protective apparatus consist of an electro-conductive plate 28, connected to ground by electro-conductive wire 30; an electro-conductive member 31, mounted upon the front face of plate 28 and in electro-conductive contact therewith, having recesses 33 in the front thereof; and an electro-conductive member or bar 35, in electro-conductive contact with member 31 and adapted to cover the fronts of recesses 33.

Plate 28, preferably of copper, is secured against the front face of backing 12 by screws 29, passing therethrough and into the backing, and preferably extends in one piece from the top of backing 12 down through a slot in base 7 to provide a simple means for effectively connecting ground wire 30 thereto, as by curling the end of the plate about the wire and securing the connection with solder.

Electro-conductive member 31, preferably of carbon, is secured snugly against the front face of plate 28 and in good electro-conductive contact therewith by screws 32 therethrough and thence through plate 28 into backing 12. Holes 34 are provided through member 31 in each recess 33 exposing portions of plate 28 therethrough to permit of the direct jump of current from fingers 40 to the plate without passing through member 31 under extremely heavy discharges of high potential current.

Member 35, preferably of carbon, is a simple bar serving to cover the fronts of recesses 33 in member 31 and provides additional electro-conductive surface facing fingers 40 to receive discharges therefrom. Member 35 bears against and is held in good electro-conductive contact with member 31 by securing screws 36 passing therethrough and thence through member 31 and plate 28 into backing 12.

My invention may readily be applied to devices differing widely in details from those employed in the one used as an illustration herein and numerous modifications may be made without departing from the scope of the appended claims.

What I claim as my invention is:

1. In a device of the character described, an electrical circuit including a conducting line wire, an electro-conductive finger in or connected to said circuit, a ground-connected electro-conductive member having a recess or pocket into which said finger extends— the wall of said pocket and surface of said finger lying closely adjacent each other but separated at all points by a suitable air gap across which abnormally heavy current on the circuit may jump from the finger to the ground-connected member and thence pass to the ground.

2. In a device of the character described, an electrical circuit including a line wire, a post of electro-conductive material interposed in the circuit, an electro-conductive finger on the post, a ground-connected electro-conductive member having a recess or pocket into which said finger extends—the wall of said pocket and surface of said finger lying closely adjacent each other but separated at all points by a suitable air gap across which abnormally heavy current on the circuit may jump from the finger to the ground-connected member and thence pass to the ground.

3. In a device of the character described, an electrical circuit including a line wire, a post of electro-conductive material interposed in the circuit, a backing or mount of nonconducting material carrying said post, an electro-conductive bar secured upon the post—one end of said bar engaging suitably with said backing to maintain the bar correctly in position and the other end of said bar terminating in an extended finger, a ground-connected electro-conductive member having a recess or pocket into which said finger extends—the wall of said pocket and surface of said finger lying closely adjacent each other but separated at all points by a suitable air gap across which abnormally heavy current on the circuit may jump from the finger to the ground-connected member and thence pass to the ground.

4. In a device of the character described, an electrical circuit including a conducting line wire, a binding post of electro-conductive material in the circuit, a non-conducting backing or mount carrying the post, an electro-conductive bar secured upon and in electro-conductive connection with said post—one end of said bar engaging suitably with said backing or mount to maintain the bar correctly in position and the other end of said bar terminating in an extended finger—, a ground-connected electro-conductive metallic plate carried by said backing, an electro-conductive member in electro-conductive contact with said metallic plate, a recess or pocket—having a hole or holes through the rear wall thereof—in said member into which said finger extends, the wall of said pocket and surface of said finger lying closely adjacent each other but separated at all points by a suitable air gap across which abnormally heavy current on the circuit may jump from the finger to the said member and pass thence to the said ground-connected metallic plate and to the ground.

5. In a device of the character described, a support, a member formed of electro-conductive material carried by the support, said member having a plurality of recesses formed therein, means connecting said member with the ground, a plurality of electric circuits positioned adjacent the member, and a finger projecting from each circuit and extending into a recess of the said member; each finger lying closely adjacent the sides of its recess but electrically insulated from the member on all sides by an air space.

6. In a device of the character described, a support, including a backing member of insulating material, a member formed of electro-conductive material supported on the backing member and electrically connected with the ground, said member having a plurality of recesses formed therein, posts attached to the backing member, each having circuit wires connected therewith whereby the posts each form a part of an electric circuit, and a metal finger attached to each post and extending into a recess of the said member, the fingers lying closely adjacent the sides of their respective recesses but insulated from the member by an air space on all sides.

7. In a device of the character described, a support, including a backing member of insulating material, a metal plate secured thereto, electro-conducting connections between the plate and the ground, a member formed of electro-conductive material attached to the plate, said member having a plurality of recesses formed therein, posts passing through and attached to the backing member, circuit wires secured to said posts adjacent their ends, and a metal finger attached to each post and extending into a recess of the said member, the fingers lying closely adjacent the sides of their respective recesses but insulated from the member on all sides by an air space.

8. In a device of the character described, a support, including a backing member having a groove therein, a metal plate secured thereto, a bar of electro-conductive material lying above the plate and secured thereto, said bar having a plurality of recesses formed in its face, a second bar of similar material secured over the first bar, a plurality of posts passing through the backing member, circuit wires secured adjacent both ends of each post, metal fingers attached one to each post and extending one into each recess, said fingers being spaced slightly from all sides of their respective recesses, extensions to the fingers seated in the groove of the backing plate, and electro-conductive means connected to the metal plate and leading to the ground.

In testimony whereof I affix my signature in the presence of two witnesses.

WILLIAM E. BRITTON.

Witnesses:
 DWIGHT S. COLE,
 CLAUDE J. FRY.